Jan. 2, 1962 C. VAN DER LELY ETAL 3,015,202
RUNNING WHEEL STRUCTURE FOR A RAKING DEVICE
AND METHODS ASSOCIATED THEREWITH
Original Filed Oct. 15, 1953 4 Sheets-Sheet 4

United States Patent Office
3,015,202
Patented Jan. 2, 1962

3,015,202
RUNNING WHEEL STRUCTURE FOR A RAKING DEVICE AND METHODS ASSOCIATED THEREWITH
Cornelis van der Lely and Ary van der Lely, Maasland, Netherlands, assignors to C. van der Lely N.V., Maasland, Netherlands, a Dutch limited company
Original application Oct. 15, 1953, Ser. No. 386,298, now Patent No. 2,861,412, dated Nov. 25, 1958. Divided and this application Nov. 25, 1958, Ser. No. 776,330
Claims priority, application Netherlands Oct. 17, 1952
5 Claims. (Cl. 56—377)

This invention relates to implements and methods for laterally displacing material lying on the ground and more particularly to implements comprising frame supported raking wheels operatively associated with running wheels. This application is a divisional of our earlier application Serial No. 386,298 filed October 15, 1953, now Patent No. 2,861,412.

It is an object of the invention to provide improved implements and methods for performing different operations such as side delivery raking operations and teddering operations.

It is a further object of the invention to provide an improved raking implement which is susceptible of being changed from one working position to another in a very simple and favorable manner.

In implements of the above indicated type and especially in such implements which employ ground driven rake wheels, substantial lateral forces are exerted on the associated structure when crop is displaced laterally. Frequently such an implement may be coupled only at one point with an associated propelling tractor and thus the implement is pivotable with respect to the tractor. As a result, there is no connection with the tractor which will resist the afore-noted lateral forces and consequently the running wheels of the structure have to resist these lateral forces.

It is typical of many implements of the above-noted type that they are of a small weight so that the pressure of the running wheels on the ground is limited. Thus, especially when the implement is used in different relative positions with respect to a travelling direction, lateral slippage or skidding may occur under various attendant circumstances.

It is therefore an object of the invention to provide an improved running wheel arrangement capable of resisting lateral slippage and sliding despite the various circumstances in which the associated implement may be employed.

Briefly, in accordance with the invention there is provided a running wheel assembly comprising at least two running wheels which are individually capable of being locked in different positions relative to a vertical axis. This arrangement has practically proven its effectiveness in various forms of raking implements of the type which will be indicated in detail hereinafter.

As a specific embodiment of the invention, there is provided a hay processing machine which is particularly adapted for swath turning and which comprises running wheels of the afore-noted type to avoid lateral displacement of the associated implement.

In accordance with a further feature of the invention, the running wheels are positioned at different distances from the point of attachment of the implement to a tractor or like device and the running wheel which is furthest from the point of attachment is lockable in any desired position.

The invention will next be explained in detail with reference to the accompanying drawing in which.

Figure 1:
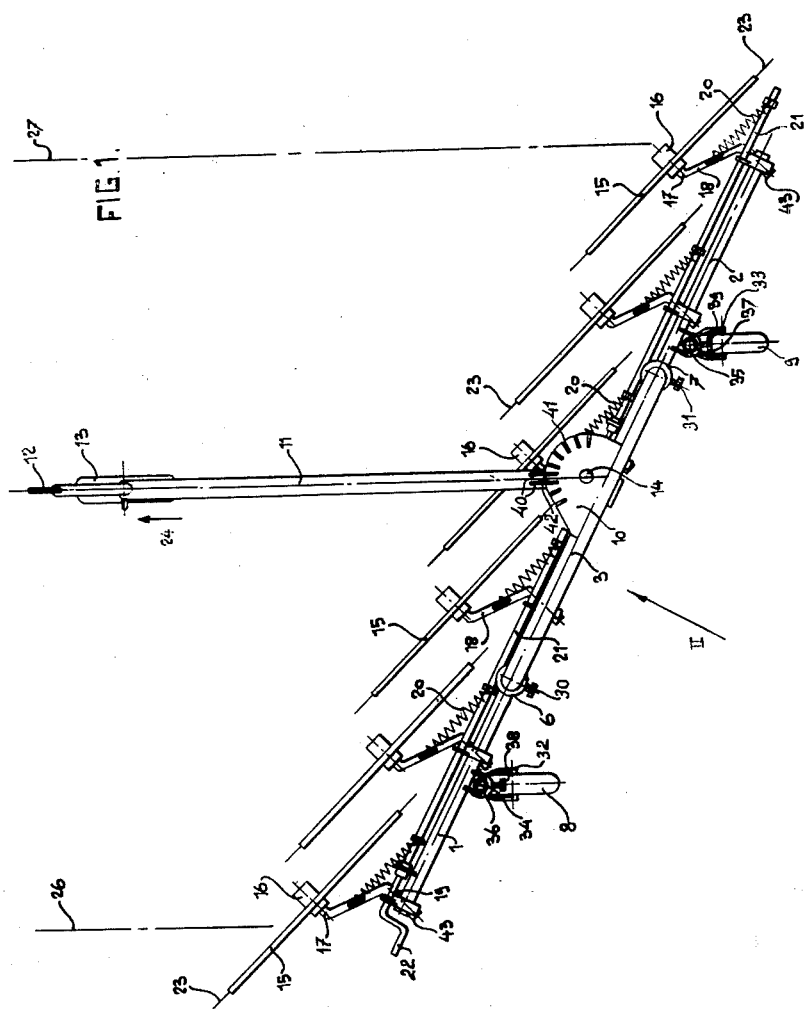
FIG. 1 is a plan view of a device embodying the invention and shown disposed for operation as a teddering device.

The illustrated device comprises a frame which is constituted by two aligned supports or separate sections 1 and 2 connected together by means of a coupling bow or yoke 3. The vertical cylindrical lower extremities 4 and 5 of the connecting bow 3 are rotatably mounted in vertical tubular members 6 and 7 which are respectively secured to the supports 1 and 2. Rotation of the supports 1 and 2 relative to the bow 3 may be prevented by means of locking or set screws 30 and 31, extending laterally into the tubular members 6 and 7, respectively, for engagement with the extremities 4 and 5 of the connecting bow. During operation of the device as a teddering device (FIG. 1) and also as a side delivery rake (FIG. 3) the supports 1 and 2 are locked relative to the bow 3 in axially aligned positions.

The support 1 is supported for ground traversing movement by a running wheel 8 located therebehind and the support 2 is correspondingly supported for ground traversing movement by a running wheel 9. The horizontal axles 32 and 33 of the running wheels 8 and 9 are rigidly connected to vertical axles 34 and 35 respectively which are rotatable in cylindrical tubular members 36 and 37 rigidly connected to the supports 1 and 2 respectively. Locking bolts or set screws 38 and 39 extend radially into the members 36 and 37 so that the wheels 8 and 9 can be adjusted around vertical axes and can be locked in any desired position.

A conventional locking device may similarly be employed for preventing rotational displacement of the running wheels. For example, the structure shown in Patent 2,522,499 to Berglund, et al., September 19, 1950 illustrates a locking arrangement which might be employed.

To the coupling bow 3 is rigidly secured a connecting member 10 carrying a draft means or draw arm 11 which is provided at its free end with a draw hook 12 and is supported at said free end by an adjustable running wheel 13. The draw arm 11 is rotatable about a vertical axle 14 of the connecting member 10 and may be locked in position in various directions relative to the bow 3, for example, by means of metal strips 40 which are engageable in selected slots of a series of slots 41 in the member 10 and simultaneously in slots 42 in the arm 11.

On the side turned away from the supporting or running wheels 8 and 9, the supports 1 and 2 are each provided with three rake wheels 15. Each of said rake wheels is rotatably disposed with its hub 16 on the crank pin 17 of a crank 18, the crank shaft 19 of which is rotatably mounted in a selected bearing 43 carried by the support 1 or 2. Each crank 18 is connected by a spring 20 to a rod 21 which is parallel to the support 1 or 2 in question and which, in order to provide for tensioning of the springs 20, is movable in longitudinal direction by the turning of an operating crank 22. The rake wheels 15 are provided with circumferential teeth 23 and, due to their weight, said rake wheels tend to turn the cranks 18, opposite to the action of the springs 20, in such direction that the rake wheels 15 lightly contact the ground with the points of their tines.

Figure 2:
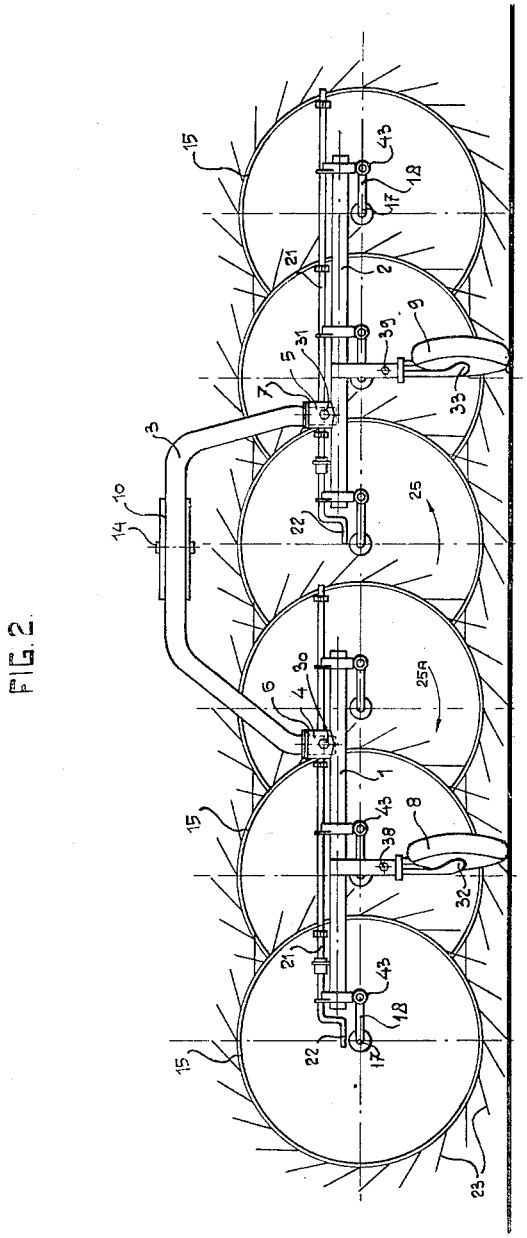
FIG. 2 is an elevational view of the device seen in the direction indicated by the arrow II in FIG. 1.

With the above described parts positioned as shown in FIG. 1, the device acts as a teddering device when it is moved in the direction of the arrow 24 by a traction force applied to the draw arm 11. Due to this movement the rake wheels 15 rotate in the direction of the arrow 25 shown in FIG. 2, by which the hay lying on the ground in front of the rake wheels is worked along a width defined by the lines 26 and 27 (FIG. 1). Along this wide area, the hay is caught and lifted by each of said rake wheels and then released. Although the rake wheels overlap each other, this overlapping arrangement is such that, with respect to each two adjacent rake wheels, considered in the line of draft or travelling direction 24, the rear part of the foremost rake wheel is located behind the front part of the following rake wheel so that none of the rake wheels can affect the working of an adjacent rake wheel.

Figure 3:
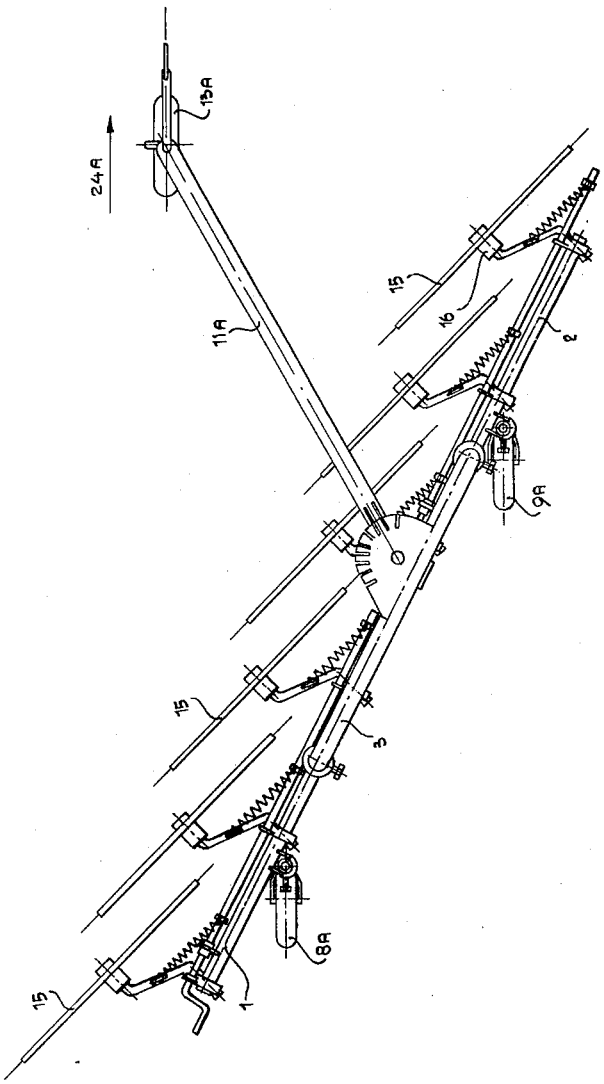
FIG. 3 is a plan view similar to FIG. 1 but showing the device arranged for operation as a side delivery rake.

If the draw arm 11 is swung from the position of FIG. 1 into the position 11A shown in FIG. 3 and is locked in this position, after which the device is moved in the direction of the arrow 24A, the running wheels being adjusted respectively to the positions 13A, 9A and 8A, the device may be used as a normal side delivery rake, provided that the rake wheels 15 are first removed with their hubs from the crank pins 17, then reversed and secured in the reversed position on the crank pins, as shown in FIG. 3. This reversal of the rake wheels is necessary, if the teeth 23, as is the case in smaller rake wheels and as has been indicated, are rearwardly inclined in the direction of rotation of the wheel. Upon movement of the device in the direction 24A, the rake wheels will rotate in opposite direction and consequently the inclined position of the teeth 23 should be adapted to the new direction of rotation (shown by arrow 25A in FIG. 2) by the reversal of the rake wheels. It will be readily understood that upon movement of the device in the direction of the arrow 24A, the overlapping arrangement of the rake wheels will be such as is required for a good raking action, i.e. considered in the travelling direction 24A the front part of the trailing rake wheel of each two consecutive rake wheels will be overlapped by the rear part of the preceding one of said rake wheels. Thus the overlapping rake wheels will cooperate with each other in such a manner that each preceding rake wheel will put the material delivered sideways within the reach of the following rake wheel.

Figure 4:
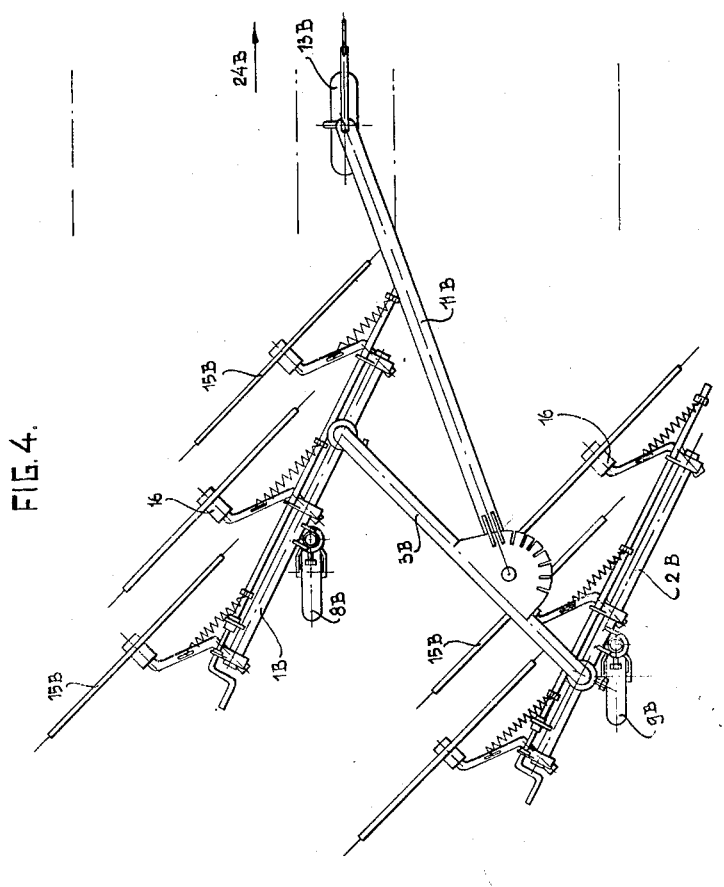
FIG. 4 is a plan view of the device arranged for operation as a swath turner.

Finally the device may serve as a swath turner as well. The coupling bow 3 is then swung with respect to the support 2 into the position 3B shown in FIG. 4, while the support 1 is swung relative to the bow to the position 1B and the rake wheels connected to said support will take the positions shown in FIGURE 4, the draw arm being put into the position 11B. By the group of rake wheels 15B of the support 1B on the one hand and by the group of rake wheels 15B of the support 2B on the other hand, a separate swath will then be turned.

When used as a teddering device (in the direction of arrow 24) and when used as a side delivery rake (direction of traction 24A), the running wheels 8 and 9, respectively, of the device may be self-adjusting or swivel wheels.

By means of the operating crank 22 which, when manipulated, varies the tension in springs 20, the cranks 18 of the rake wheels may be turned in their bearngs so as to adjust the pressure of the rake wheels 15 on the ground and, if desired, to lift said rake wheels entirely from the ground.

In the illustrated teddering device the rake wheels are arranged in a single row. It will be understood that said wheels may be arranged as well in two or more rows disposed in echelon with regard to each other.

There has been indicated above apparatus comprising a mobile frame having rake wheels thereupon for displacing crop lying on the ground. With this mobile frame are associated at least two running wheels, one of which for each operating position of the structure has a fixed position relative to the frame in parallel to the direction of travel of the implement. The other running wheel is freely pivotable about a vertical axis. In the different working positions illustrated, one running wheel is always positioned further from the point of attachment of the implement to a tractor or like device than is the other running wheel. Preferably, the running wheel which is furthest from the tractor is that running wheel which is locked in position. It will be appreciated, however, that the running wheels may be interchangeably furthest from the point of attachment of the implement to the tractor so that consequently provision is made whereby either running wheel can be selectively locked in position.

It is also to be noted that the invention relates to methods for preventing lateral skidding, these methods generally involving locking one of two running wheels which are pivotable about vertical axis in fixed position for purposes of maintaining uniform the direction of the associated implement while offering maximum resistance to lateral displacement.

There will now be obvious to those skilled in the art many modifications and variations of the methods, structures and apparatus set forth above. These modifications and variations will not, however, depart from the spirit of the invention as defined in the following claims.

What is claimed is:

1. A side delivery rake for laterally displacing crop lying on the ground comprising a mobile frame, a plurality of rake wheels arranged in echelon on the frame and oblique to the direction of travel of the latter, the rake wheels being rotated by contact with the ground, two spaced running wheels pivotally mounted on the frame, each of which is adjustable in a horizontal plane, locking means on the frame for each running wheel whereby each running wheel can be locked in one of a plurality of positions relative to said frame, a draw arm pivotally connected to the frame, and means for adjustably locking said draw arm in one of a plurality of different positions relative to said frame.

2. An implement according to claim 1, wherein the frame comprises two supports for mounting the rake wheels and each support is supported by one of said running wheels, each running wheel being adjustable about a substantially vertical axis.

3. An implement according to claim 1, wherein said rake wheels are operatively associated in groups and in each group being in overlapping relationship, one of said running wheels being located behind one group of said rake wheels and the other of said running wheels being located behind the other group of said rake wheels.

4. An implement as claimed in claim 1 comprising, for each running wheel, a vertical axle rotatable on the frame and a horizontal axle coupled to the vertical axle and rotatably supportng the associated running wheel.

5. An implement as claimed in claim 1 comprising a third running wheel on said draw arm and supporting the same.

References Cited in the file of this patent

UNITED STATES PATENTS 2,680,343     Enos _____ June 8, 1954

FOREIGN PATENTS 986,330     France _____ Mar. 21, 1951
680,537     Great Britain _____ Oct. 8, 1952